United States Patent [19]
Winfrey

[11] Patent Number: 5,367,350
[45] Date of Patent: Nov. 22, 1994

[54] OVERHEAD PROJECTOR ILLUSTRATION SLATE

[76] Inventor: David M. Winfrey, 5066 N. Oak Trafficway, Kansas City, Mo. 64118

[21] Appl. No.: 214,854

[22] Filed: Mar. 18, 1994

[51] Int. Cl.⁵ ............................................. G03B 21/00
[52] U.S. Cl. .............................. 353/120; 353/DIG. 3; 353/22; 434/408
[58] Field of Search ..................... 353/22, 23, 120, 95, 353/DIG. 5, DIG. 3; 434/408, 413, 423, 425

[56] References Cited
U.S. PATENT DOCUMENTS

| | | | |
|---|---|---|---|
| 3,661,449 | 5/1972 | Wright | 353/120 |
| 3,807,850 | 4/1974 | Ozeki | 353/23 |
| 5,223,868 | 6/1993 | Coiner, II | 353/DIG. 5 |

*Primary Examiner*—William A. Cuchlinski, Jr.
*Assistant Examiner*—William C. Dowling

[57] ABSTRACT

The overhead projector dry-erase accessory of this invention comprises a transparent, rigid, multi-layered body (12) into which overhead transparencies can be placed and utilized. The multiple layers of the device are created by either folding a single piece of transparent substrate in half, or by attaching two separate transparent plates at a single peripheral seam, with an adhesive strip 22. A transparent, dry-erase overlay (16) covers the top surface of the device, with the overlay being attached to the device at two opposing edges. A plurality of overlay spacer and attaching strips (18) both join the overlay (16) to the top plate of the device (14) and raise the overlay off of the top plate so as to create an air pocket for placement of tabbed or untabbed inserts therebetween. The attached edges of the overlay and the top plate of the device are protected, and the peripheral seams are further reinforced by a protective cap (20) placed over and further reinforcing them. The device has bumper tabs permanently secured to its bottom surface at at least four corners.

3 Claims, 2 Drawing Sheets

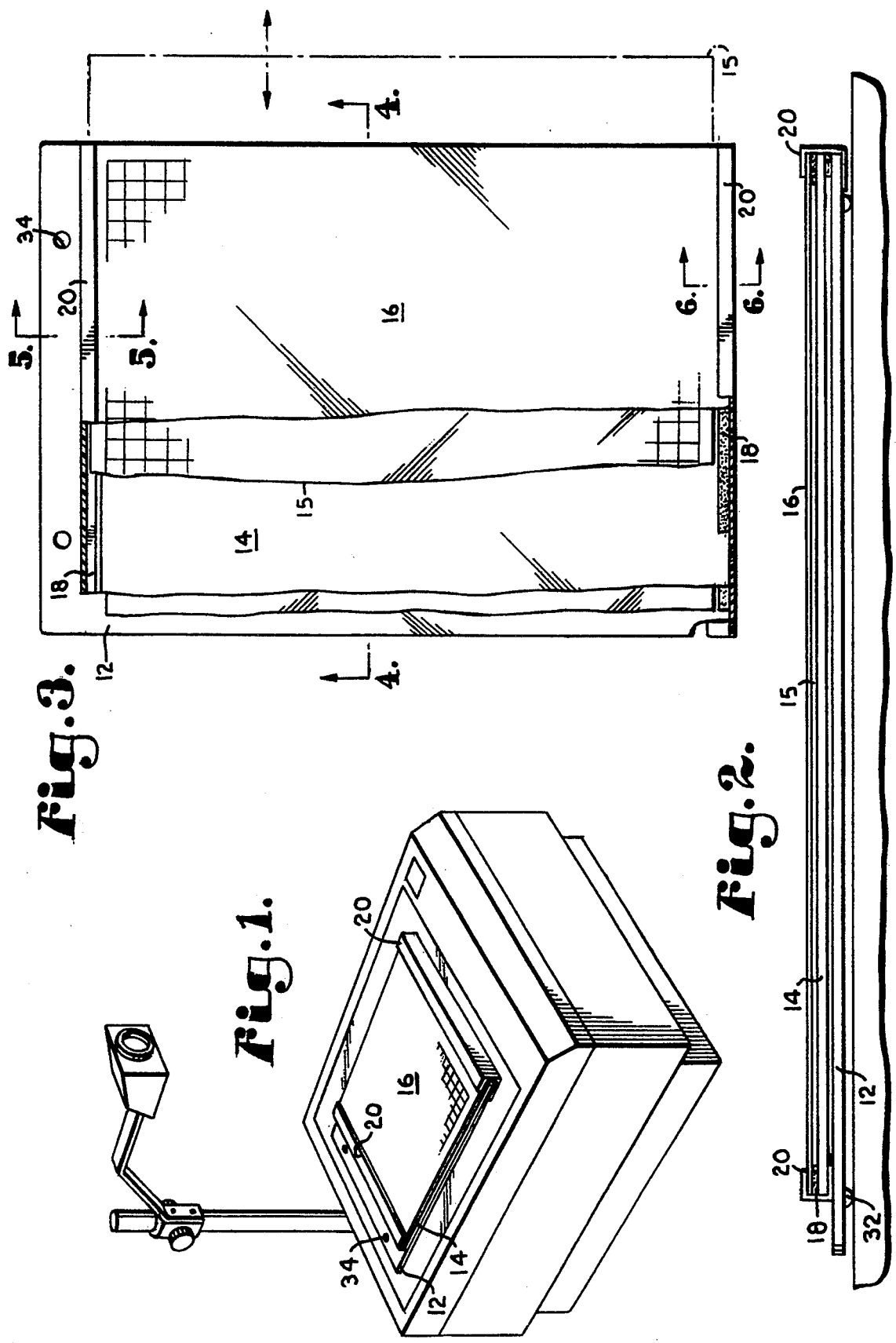

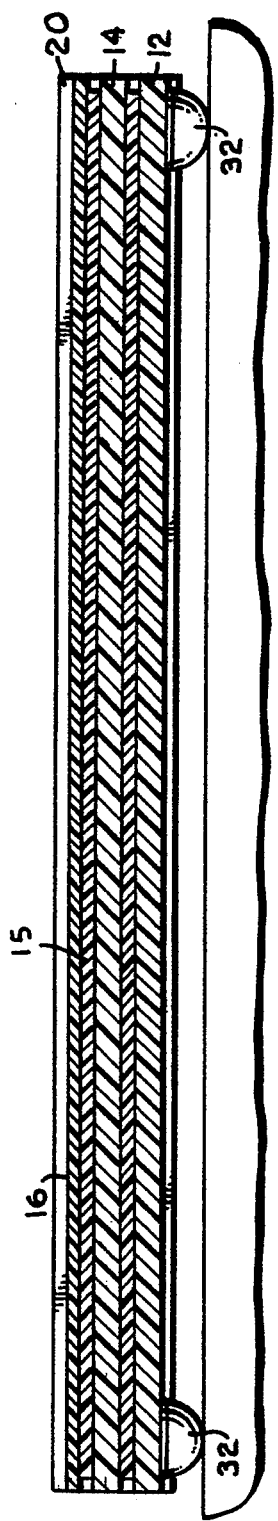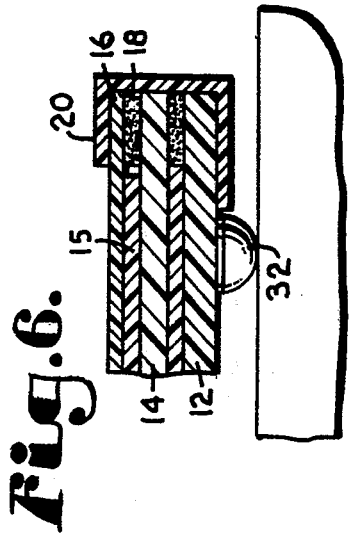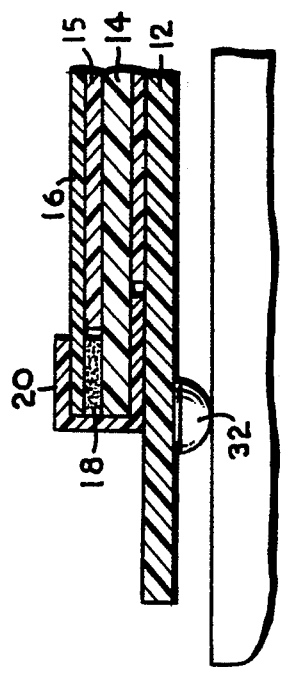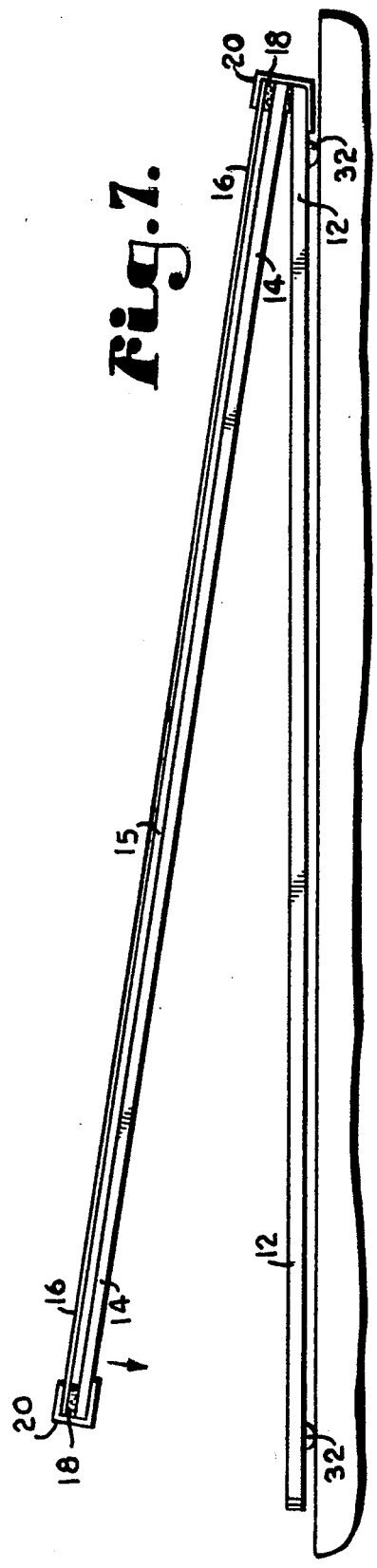

OVERHEAD PROJECTOR ILLUSTRATION SLATE

BACKGROUND--CROSS-REFERENCE TO RELATED APPLICATIONS

This invention is related to the dry-erase overlay element of my co-pending application, Ser. No. 08/064,886, filed May 24, 1993, and now abandoned.

BACKGROUND-FIELD OF INVENTION

This invention is broadly associated with the art of overhead projector accessories and specifically with a dry-erase diaplay and marking slate which allows temporary marking and erasure of hand-written indicia made in relation with permanent transparency indicia displayed on an overhead projector stage.

BACKGROUND-DESCRIPTION OF PRIOR ART

A user of pre-marked or pre-printed transparencies containing permanent indicia for visual aid purposes generally is limited to a place-and-point use of the transparency. In other words, when one uses transparencies to display pre-printed indicia to an audience, he or she is limited to placing the transparency upon the overhead projector stage and pointing to particular information under discussion. Existing art does not allow one a place-and-mark use of transparencies-that is the ability of the user to place a pre-marked transparency upon the overhead projector stage, and to make temporary and readily eraseable markings on the transparency in relation to the pre-marked indicia.

Notwithstanding recent technological advances in LCD panels which allow the integration of computers and overhead projectors for display of computerized information, significant limitations on the use of overhead projector transparencies for dry-erase and wet-erase purposes persist. Because of the relative high cost of LCD panels, such devices remain out of reach to a large sector of the overhead projector market. Moreover, the pre-programmed prompts available with LCD panels cannot replace simple handwritten illustrations essential to public speaking and group presentations.

A presenter's inability to use eraseable markers on pre-printed transparencies exists because the chemical constituents in both dry-erase and wet-erase marker ink will, upon removal, obliterate some or all of the permanent indicia placed on the transparency. With the use of dry-erase markers, the chemicals in the ink itself react to obliterate the printed ink. With the use of damp-erase markers, the water or other liquid used to remove the markings will reduce the opacity of the permanent indicia.

Nevertheless, occasions often occur where a speaker would be better able to communicate his or her point, by making readily eraseable markings in association with the permanent information on the transparency. An example of the need for handwritten illustrations may be best typified where a speaker is displaying charted or graphed information, and would like to illustrate comparisons or contrasts between the charted data and other relevant extrinsic data. If a speaker could freely mark over displayed indicia, and erase such markings without partially or wholly obliterating the permanent indicia, he or she could more effectively engage their audience into the subject matter being discussed. This heightened audience involvement arises from the speaker's ability to illustrate to the audience areas of distinction, variation, or other emphasis, during discussion, rather than merely pointing to indicia which has already been printed.

There currently exists no device which facilitates the use of markers on pre-printed overhead projector transparencies. Even in instances where a temporary marker could conceivable be utilized with pre-printed transparencies, the inconvenience of such use outweighs the utility gained from such use. For example, although one may utilize overhead projector markers (which are damp-erase in nature) on transparencies which have photocopied indicia on it, the same wet-erase markers can not be used to mark upon transparencies printed thereon with a waxy material. The moisture utilized to remove the marking, will likely also disturb the waxy permanent indicia. As technology continues to advance, more sophistocated printers are converting to wax print, and such print will tolerate no overmarkings. Moreover, in instances where the user is able to utilize overhead projector markers, the user must also keep available a sourse of moisture to remove the handwitten information upon completion, if he or she wishes to reuse the transparency in a similar fashion.

Although, overhead projector markers work optimally with blank transparencies which are designed for reuse or which can be cleaned at a later time, they are not a practicable means of marking over printed material where such markings are expected to be easily replaced with different information during a presentation. Even where overhead projector markers are appropriately used with blank or photocopied transparencies, the presenter is further inconvenienced in that in so using the markers, he or she must also manually immobilize the transparency during marking and erasure, thus often blocking the light and the displayed indicia during such markings and erasures. The presenter is unable to unobstrusively stand to one side of the machine and make one-handed markings and erasures on transparencies during use.

Furthermore, many overhead projectors have a cooling fan which either directly or indirectly creates air currents thus creating movement of the transparency. Other projectors have ordinary motor vibration which causes the transparency to move upon the projector stage during display. Any such movement may become annoying, and furthermore becomes disruptive where the user is attempting to trace the projected graphic on a poster or similar surface. The vibration of the projector, coupled with any incidental wind currents, renders it almost impossible to use transparencies for artistic tracing purposes.

What is needed in the art to remedy the above shortcomings, and what the apparatus of this invention provides, is a dry-erase display and marking slate which allows the user to insert one or more pre-printed transparencies beneath a protective sheet having a dry-eraseable surface, and to thereafter mark upon the surface of the device with a temporary marker and erase such markings without obliterating the permanent indicia on the transparency. The device of this invention also can be utilized with LCD presentation panels and document video converters by simply placing the slate upon the stage of the panel or the converter.

The device of this invention is further uniquely designed to respond in kind to the intense heat often generated by overhead projector lamps, without resulting in warping or melting of the device or melting of the transparency's permanent indicia. Moreover, the device is equipped with traction tabs enabling the user to make one-handed markings upon and erasures from off of the surface of the device without slippage of the transparency over the projector stage. The traction tabs further space the device away from the projector stage so as to allow ventilation of the device to reduce heat generated by the projector lamp.

OBJECTIVES AND ADVANTAGES

Accordingly, several objects and advantages of the present invention are intended to remedy the lack of temporary marking capabilities in overhead projector use. These objects and advantages, which will become more apparent from the specification and the drawings, include:

(a) to provide a device which allows the user to make markings over, and erase such markings from over, permanent transparency indicia, without obliterating the permanent indicia, and without adversely impacting the underlying machine.

(b) to provide a device which immobilizes transparencies placed upon the overhead projector stage, whereby the presenter may make one-handed markings and erasures onto and off of the device, thus enabling the presenter to avoid physical obstruction of the visual display;

(c) to provide a device which is uniquely designed to withstand intense heat created by the overhead projector lamp;

(d) to provide a device which is user-friendly whereby the presenter can utilize it without having to engage in distracting efforts to either insert transparencies or remove them from the device.

(e) to provide a device which can be utilized with technology such as the LCD presentation panels and document video converters.

(f) to provide a means of immobilizing transparencies upon the stage of an overhead projector, visa vis vibration and projector fan-generated air currents, for extentended periods of time where a user desires to trace enlarged graphics or texts from a transparency display.

BRIEF DESCRIPTION OF THE DRAWINGS

For a better understanding of this invention, reference is made to the attached drawing, wherein:

FIG. 1 shows an elevational perspective view of the device in its overhead projector environment;

FIG. 2 shows a cross-sectional side view of the device;

FIG. 3 shows an above elevational view of the device with transparancies inserted therein;

FIG. 4 shows an enlarged cross-sectional frontal view of the device;

FIG. 5 shows an enlarged sectional side view of the opened end of the device;

FIG. 6 shows an enlarged sectional side view of the closed end of the device;

FIG. 7 shows a side view of the device in a slightly opened position for insertion of transparencies.

LIST OF REFERENCE NUMERALS

Referring to the drawings, the following are illustrated,

Number 12 shows the bottom plate of the device;
Number 14 shows the top plate of the device;
Number 16 shows the dry-erase overlay;
Number 18 shows the overlay spacing and adhesive element;
Number 20 shows the edge protector cap;
Number 22 shows the spacing element for the rigid plates;
Number 32 shows the bumper tabs;
Number 34 shows mounting holes.

SUMMARY OF INVENTION

This invention is an overhead projector illustration slate into which pre-printed transparencies can be placed, and upon which temporary markings can be made in association with, and relative to, the permanent indicia printed on the inserted transparency, without obliterating the permanent indicia upon removal of the temporary markings. The device consists of a plurality of rigid, transparent plates, made of a material such as, but not limited to, acrylic plastic, commonly referred to as plexiglass. The body of the device has a U-shaped configuration wherein transparencies may be placed and exhibited between the top and bottom plates of the device.

On the top plane of the device is secured a dry-eraseable transparent overlay, affixed to the top plate at peripheral edges, so as to create an air pocket for the insertion of transparencies between the top plate of the device and the overlay. The plurality of transparent layers of the device accommodates the insertion of multiple transparencies for exhibition in relationship with one another. For example, a biology instructor may insert multiple transparencies containing different but related anatomical information into the device and exhibit anatomical interrelationships or functions. To further illustrate the interrelationship between the indicia on the two transparencies, the instructor can mark upon the surface of the device with either a dry-erase or overhead projector marker, and simply erase the markings with the wipe of a finger or with a damp tissue.

The device is designed to withstand intense heat from the overhead projector lamp because its unique "U"-shaped design allows the top plate of the device to separate from the bottom plate in response to such intense heat. The natural separation of the two rigid plates of the device reduces the degree of pressure and heat which otherwise would be applied upon the surface of the transparency. As such, the permanent indicia does not melt onto the inside plane of the device.

The top plate of the device, when exposed to extensive amounts of underlying projector-lamp heat, also naturally concaves slightly, creating a swale beneath the overlay, thus separating the anterior surface of the overlay from the top surface of the upper plate. This natural separation also reduces both the degree of heat and pressure otherwise applied to the inserted transparency. As mentioned above, this physical separation prevents the indicia on the transparencies from melting and becoming transposed upon the underside of the overlay.

The device has bumber tabs which immobilize the device on the projector stage, and allows the user to mark on the surface and erase such markings with the use of one hand.

DETAILED DESCRIPTION OF THE PREFERRED EMBODIMENT

Referring more specifically to the drawings, for illustrative purposes, the fundamental design of the present invention is the apparatus generally shown in FIG. 1. It will be appreciated that the apparatus may vary as to dimension and as to details of the parts without departing from the basic concepts as disclosed herein.

Referring to FIG. 3, the device of this invention is comprised primarily of three transparent sheets, two of which are in the form of rigid plates 12, & 14, and one of which is in the form of a pliable overlay sheet 16. The overlay has a dry-eraseable surface. The multiple transparent plates and the overlay accommodate the overhead projection of multiple transparancies for purposes of illustrating interrelationships between indicia exhibited on the respective transparencies. As well, the device facilitates the use of dry-erase markers thereon, whereby the user can further illustrate interrelationships among the transparencies, or simply supplement pre-printed information contained on a single transparency, by marking upon the dry-eraseable overlay.

The invention comprises a rigid, transparent body having a top plate 14 and a bottom plate 12 which are peripherially attached at one edge. The top and bottom planes of the device may either be part of a single sheet of transparent substrate folded over to create a "U"-shaped configuration, or it can be created by using separate sheets of transparent substrate which are bound together with a spacing element 22 permanently affixed between the peripherially attached edges. The body of the device may be, but need not be, contructed acrylic plastic having the tradename plexiglass. The use of an acrylic plastic substrate provides a durable yet transparent body. Moreover, acrylic plastic may be readily molded into the appropriate configuration.

When separate plates are utilized to create the body of the device, the plates may be peripherially attached using double-sided adhesive tape. Where a double-sided adhesive is used to attach the two rigid plates of the device 12 & 14, the adhesive will have an attaching strength sufficient to accommodate a reasonable degree of separation of the two rigid plates 12 & 14 from one another for removal of inserts from between the two rigid plates of the device.

Referring to FIG. 7, the connecting seam between the two rigid plates is designed with sufficient flexibility to enable the top rigid plate 14 to be raised slightly from the surface of the bottom rigid plate 12 thus enabling removal of inserts therebetween. When released, the two rigid plates return to a natural resting state wherein the two plates are minimally separated from one another.

The two rigid plates of the device 12 & 14 are designed to secure transparencies in place. The two plates may be minimally separated from one another, for the purpose of inserting or removing transparencies from between the top and bottom plates, by simply pulling the two plates in opposite directions, and inserting or removing the transparancies.

Referring to FIGS. 2 & 3, the invention further comprises a dry-erasable transparent overlay 16, peripherially attached, on two opposing edges, to the major top surface of the uppermost plate 14. The overlay 16 is spaced off of the upper surface of the top plate to which it is affixed 14 so as to create an airpocket into which transparencies may be placed for display. Transparent inserts may be placed beneath the dry-eraseable overlay, and dry-eraseable markings may be made on the overlay in association with indicia exposed through the overlay. Said markings will be projected onto the viewing screen. The markings may be easily removed from the dry-eraseable surface with the use of a finger or dry cloth or tissue.

Transparencies placed beneath the dry-erase overlay sheet may be removed by placement of a permanent tab thereon, or by using a gummed paper tab for such removal. Dry-erase indicia may be marked on the overlay in association with indicia on the insert. Dry-erase indicia placed on the surface of the overlay may be erased with a dry-cloth or with the fingertip.

Referring further to FIG. 2, the overlay is slightly raised from the major surface of the top plate by an overlay spacer and adhesive strip 18 at opposing edges referred to herein as the open and attached edges. The spacers serve both a spacing function and an attaching function; they attach the overlay 16 to the top plate of the device 14 at two attaching seams, and raise the overlay 16 off of the top plate 12 so that inserts can be placed thereunder. The overlay spacer and adhesive strip 18 is preferably comprised of, but is to no extent limited to, a double-sided foam adhesive. The overlay spacer and adhesive strip 18 traverses the full length of the overlay 16 edge to which it is affixed. It is sandwiched between the top plate of the device 14 and the overlay sheet 16. When attached, the overlay sheet is stretched tightly above the top plate so as to provide an air pocket for the insertion of transparancies.

Referring to FIGS. 5 and 6, the two attaching seams are protected and further reinforced by protective caps 20 which slip over the respective edges of the device. The protective cap 20 is in the form of an extrusion having a "J" or "U" shaped profile. It may be made of a flexible material such as acrylic plastic, and is designed to provide continuous pressure upon the plate(s) and the overlay so as to keep them in place, and to bar residue from entering and contaminating the connecting seams of the device 16.

Referring to FIG. 7, the device has a plurality of bumper tabs 32 permanently affixed to the underside of the device to serve both a traction function for the device and to raise the device from off of the surface of the projector, reducing chances of scratching of either the device or the projector. The bumper tabs 32 further provide a ventilation function whereby ambient air can circulate beneath the device thus reducing the heat from the projector lamp which would otherwise be directly targeted at the underside of the device.

The device may also be designed with mounting holes 34, whereby the device may be mounted and used as a display board when not utilized with an overhead projector. One using the device for a display board, may create a background to the board by simply inserting an opaque sheet of paper between any of the two plates of the device.

CONCLUSION, RAMIFICATIONS, AND SCOPE

Accordingly, a user of this invention may utilize it either without transparancies, and simply as a marking surface, or with one or more transparencies to illustrate interrelationships between indicia displayed thereon. The device is designed to for use on standard-sized overhead projector stages. The bumper tabs immobilize the device and the exhibited transparancy so that the user may mark and erase on the device using only one hand, rather than having to secure the transparancies with one hand when marking on them with temporary markers.

The device is uniquely designed to accommodate the intense heat of the overhead projector lamp without resulting in adverse impact on either the device or the inserted transparencies. The two rigid plates of the device respond in kind to the heat from the lamp by slight separation whereby the top plate further separates from the bottom plate, thus reducing the amount of contact among the two plates and the inserted transparancy, and consequently reducing the chances that the plates, under intence projector lamp heat, will cause melting of and removal of some of the printed ink from the transparency. Moreover, the top plate of the device responds to the lamp's heat by slightly concaving when subjected to intense lamp heat, while on the other hand, the overlay remains relatively flat. The concaving of the top plate reduces the amount of pressure which it may otherwise apply to the insert placed beneath it and the overlay.

What is claimed:

1. An overhead projector illustration slate comprising:
   (a) a plurality of similarly-sized rigid and transparent sheets secured in fixed registry in relationship with one another;
   (b) a transparent, dry-eraseable overlay, substantially the same size and shape as the said rigid and transparent sheets, peripherially attached to completely cover one major surface of at least one said rigid and transparent sheet;
   (c) a spacing element peripherally interposed between coinciding edges of said at least one rigid and transparent sheet and said transparent, dry-eraseable overlay, at opposing ends of said overhead projector illustration slate, in a manner which maintains said transparent, dry-eraseable overlay in a spaced apart relationship with said at least one rigid and transparent sheet, creating an air pocket which accommodates insertion and immobilization of an arbitrary transparency.

2. An overhead projector illustration slate comprising:
   (a) a plurality of similarly-sized rigid and transparent sheets secured in fixed registry in relationship with one another;
   (b) a spacing element peripherally interposed between a single set of coinciding edges of said rigid and transparent sheets in a manner which maintains said rigid and transparent sheets in a spaced apart relationship with one another, creating an air pocket which accommodates insertion of an arbitrary transparency;
   (c) a transparent, dry-eraseable overlay, substantially the same size and shape as the said rigid and transparent sheets, peripherially attached to at least one rigid and transparent sheet;
   (d) a spacing element peripherally interposed between coinciding edges of said at least one rigid and transparent sheet and said transparent, dry-eraseable overlay, at opposing ends of said overhead projector illustration device, in a manner which maintains said overlay in a spaced apart relationship with said at least one rigid and transparent sheet, creating an air pocket which accommodates insertion of an arbitrary transparency.

3. An overhead projector illustration slate comprising:
   (a) a plurality of rigid and transparent sheets secured in fixed registry in relationship with one another;
   (b) a transparent, dry-eraseable overlay, substantially the same size and shape as said rigid and transparent sheets, peripherially attached to at least one rigid and transparent sheet at opposing ends;
   (c) a spacing element peripherally interposed between said at least one rigid and transparent sheet and said transparent, dry-eraseable overlay, in a manner which maintains said transparent, dry-eraseable overlay in a spaced apart relationship with said at least one rigid and transparent sheet, creating an air pocket which accommodates insertion of an arbitrary transparency;
   (d) a protective cap disposed over peripherally-secured edges of said transparent, dry-eraseable overlay and one or more of said rigid and transparent sheets, in a manner which bars said edges from disassociation or undue wear and tear.

* * * * *